(12) United States Patent
Balissat et al.

(10) Patent No.: US 7,562,386 B2
(45) Date of Patent: Jul. 14, 2009

(54) MULTIPOINT SERVER FOR PROVIDING SECURE, SCALEABLE CONNECTIONS BETWEEN A PLURALITY OF NETWORK DEVICES

(75) Inventors: Joel Balissat, La Gaude (FR); Claude Galand, Saint-Paul (FR); Jean-Francois Le Pennec, Nice (FR); Jean-Marie Sommerlatt, Cagnes sur Mer (FR)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 0 days.

(21) Appl. No.: 11/703,021

(22) Filed: Feb. 6, 2007

(65) Prior Publication Data

US 2007/0180514 A1    Aug. 2, 2007

Related U.S. Application Data

(63) Continuation of application No. 10/115,462, filed on Apr. 4, 2002, now Pat. No. 7,203,957.

(51) Int. Cl.
*G06F 15/00* (2006.01)
(52) U.S. Cl. ....................................................... 726/15
(58) Field of Classification Search .................. 726/15, 726/2, 3, 14
See application file for complete search history.

(56) References Cited

U.S. PATENT DOCUMENTS

| 5,732,275 | A | 3/1998 | Kullick |
|---|---|---|---|
| 5,745,701 | A | 4/1998 | Nguyen-Thai |
| 5,825,891 | A | 10/1998 | Levesque |
| 5,835,729 | A | 11/1998 | Shwed |
| 5,940,591 | A | 8/1999 | Boyle |
| 5,958,013 | A | 9/1999 | King |
| 5,983,350 | A | 11/1999 | Minear |
| 6,006,259 | A | 12/1999 | Adelman |
| 6,038,322 | A | 3/2000 | Harkins |
| 6,049,878 | A | 4/2000 | Caronni |
| 6,055,236 | A | 4/2000 | Nessett |
| 6,078,953 | A | 6/2000 | Vaid |

(Continued)

FOREIGN PATENT DOCUMENTS

EP    1 093 255    4/2001

(Continued)

OTHER PUBLICATIONS

U.S. Appl. No. 10/115,554, Balissat, filed Apr. 4, 2002.

(Continued)

*Primary Examiner*—Ellen Tran
(74) *Attorney, Agent, or Firm*—Michael Haynes PLC; Michael N. Haynes

(57) ABSTRACT

A method and system for implementing secure communications between a plurality of devices are provided. The method and system generally include the provision of at least one common encryption parameter to each of the plurality of devices, as well as an identification of the plurality of devices to one another. This information can be maintained and shared by interaction of the plurality of devices with a designated server device. In this way, a secure, point-to-point connection between at least two of the plurality of devices can be established.

23 Claims, 7 Drawing Sheets

U.S. PATENT DOCUMENTS

| | | | |
|---|---|---|---|
| 6,079,020 | A | 6/2000 | Liu |
| 6,091,820 | A | 7/2000 | Aziz |
| 6,092,200 | A | 7/2000 | Muniyappa |
| 6,105,027 | A | 8/2000 | Schneider |
| 6,182,226 | B1 | 1/2001 | Reid |
| 6,195,751 | B1 | 2/2001 | Caronni |
| 6,226,751 | B1 | 5/2001 | Arrow |
| 6,253,321 | B1 | 6/2001 | Nikander |
| 6,269,099 | B1 | 7/2001 | Borella |
| 6,275,588 | B1 | 8/2001 | Videcrantz |
| 6,289,382 | B1 | 9/2001 | Bowman-Amuah |
| 6,304,973 | B1 | 10/2001 | Williams |
| 6,330,562 | B1 | 12/2001 | Boden |
| 6,332,163 | B1 | 12/2001 | Siegel |
| 6,353,886 | B1 | 3/2002 | Howard |
| 6,496,867 | B1 | 12/2002 | Beser |
| 6,636,898 | B1 | 10/2003 | Ludovici |
| 6,662,221 | B1 | 12/2003 | Gonda |
| 6,684,336 | B1 * | 1/2004 | Banks et al. ............... 709/227 |
| 6,697,354 | B1 | 2/2004 | Borella |
| 6,826,684 | B1 | 11/2004 | Fink |
| 6,883,100 | B1 | 4/2005 | Elley |
| 6,915,437 | B2 | 7/2005 | Swander |
| 6,931,529 | B2 | 8/2005 | Kunzinger |
| 6,938,155 | B2 * | 8/2005 | D'Sa et al. ............... 713/160 |
| 6,954,790 | B2 | 10/2005 | Forslow |
| 6,976,177 | B2 | 12/2005 | Ahonen |
| 7,003,662 | B2 | 2/2006 | Genty |
| 7,028,335 | B1 | 4/2006 | Borella |
| 7,054,319 | B2 | 5/2006 | Akahane |
| 7,107,464 | B2 * | 9/2006 | Shapira et al. ............... 726/15 |
| 7,159,031 | B1 * | 1/2007 | Larkin et al. ............... 709/238 |
| 2001/0009025 | A1 | 7/2001 | Ahonen |
| 2001/0020273 | A1 | 9/2001 | Murakawa |
| 2001/0023443 | A1 | 9/2001 | Fichou |
| 2001/0047474 | A1 | 11/2001 | Takagi |
| 2001/0047487 | A1 * | 11/2001 | Linnakangas et al. ....... 713/201 |
| 2002/0016926 | A1 * | 2/2002 | Nguyen et al. ............... 713/201 |
| 2002/0052200 | A1 * | 5/2002 | Arkko et al. ................ 455/432 |
| 2002/0093915 | A1 | 7/2002 | Larson |
| 2002/0144144 | A1 | 10/2002 | Weiss |
| 2003/0018813 | A1 | 1/2003 | Antes |
| 2003/0061505 | A1 | 3/2003 | Sperry |
| 2003/0069958 | A1 | 4/2003 | Jalava |
| 2003/0135753 | A1 | 7/2003 | Batra |
| 2003/0154259 | A1 | 8/2003 | Lamberton |
| 2003/0191937 | A1 | 10/2003 | Balissat |
| 2004/0066747 | A1 | 4/2004 | Jorgensen |
| 2004/0093492 | A1 | 5/2004 | Daude |
| 2005/0088977 | A1 | 4/2005 | Roch |

FOREIGN PATENT DOCUMENTS

| | | |
|---|---|---|
| EP | 1 418 730 | 5/2004 |
| EP | 1 657 880 | 8/2007 |
| WO | WO 99/67930 | 12/1999 |
| WO | WO 00/19678 | 4/2000 |
| WO | WO 01/16766 | 3/2001 |

OTHER PUBLICATIONS

De Clercq, "An Architecture for Provider Provisioned CE-based Virtual Private Networks", Jun. 1, 2002, 17 pages, France.

Gong, Li, ""Enclaves: Enabling Collaboration Over the Internet" IEEE Journal on Selected Areas in Communications", IEEE Journal on Selected Areas in Communications, Apr. 1, 1997, 567-575 pages, vol. vol. 15, No. 3, XP000683948, ISSN: 073-8716, IEEE Inc.

Hunt, "PKI and Digital Certification Infrastructure", Oct. 1, 2001, 6 pages, US.

Younglove, "Public Key Infrastructure/ How it Works", Apr. 1, 2001, 4 pages, US.

* cited by examiner

| DEVICE NAME | IP ADDRESS | PUB KEY 1 | PUB KEY 2 | PUB KEY 3 |
|---|---|---|---|---|
| A | 10.10.10.1 | D KEY A | A KEY A | E KEY A |
| B | 10.10.10.2 | D KEY B | A KEY B | E KEY B |
| C | 10.10.10.3 | D KEY C | A KEY C | E KEY C |

VPN1 S TABLE

FIG6A

| DEVICE NAME | IP ADDRESS | PUB KEY 2 | STATUS |
|---|---|---|---|
| A | 10.10.10.1 | A KEY A | ACTIVE |
| B | 10.10.10.2 | A KEY B | NC |
| C | 10.10.10.3 | A KEY C | PEND |

VPN1 DISTRIBUTED TABLE

FIG6B

MULTIPOINT SERVER FOR PROVIDING SECURE, SCALEABLE CONNECTIONS BETWEEN A PLURALITY OF NETWORK DEVICES

CROSS-REFERENCES TO RELATED APPLICATIONS

This application is a continuation of, claims priority to, and incorporates by reference herein in its entirety, U.S. patent application Ser. No. 10/115,462, filed 4 Apr. 2002 now U.S. Pat. No. 7,203,957.

BACKGROUND OF THE INVENTION

1. Field of the Invention

The present invention relates to the formation and use of secure network connections. More specifically, the present invention relates to forming secure, scaleable network connections for a plurality of network devices.

2. Description of the Related Art

Computer networks, and in particular Wide Area Networks (WANs) such as the Internet, provide opportunities for the misuse and abuse of communications traveling thereover. For example, two users communicating via the WAN may have their communications intercepted and/or altered. Also, it is possible for one user to misrepresent his or her identity to another user. As a final example, a user may utilize network resources and communications to disrupt all or part of the network.

Thus, there is a need for both privacy and authentication between users of the WAN communicating with one another. In other words, users should be able to rely on the fact that their transmissions will not be intercepted or altered, and that transmissions from someone purporting to be a particular user do in fact originate from that user.

One type of defense against ill-intentioned uses of the WAN is a device operating at the edge of a private network, such as a Gateway, Firewall or some other dedicated network appliance. Such a device operates to filter transmissions between the private network and the WAN and/or to protect the transmissions that do go through by encrypting/decrypting (i.e., encoding/decoding) those transmissions.

Other related types of defenses function by establishing the identity of a sender and/or recipient before sending/receiving a communication. Still other defenses include establishing a secure channel between two communicating devices.

A particular conventional protocol for providing security between devices operating over an Internet Protocol (IP) network is known as IPsec. Short for IP Security, IPsec is a set of protocols supporting the secure exchange of IP packets at a network layer. Two of the protocols used are the Authentication Header protocol (AH) and the Encapsulating Security Payload protocol (ESP).

AH is designed to ensure that transmitted packets are not altered during transit over the network, but does not protect the contents of the packets from being viewed by other users of the network such as intercepting parties. ESP, on the other hard, ensures the confidentiality of the packet contents. ESP provides an optional authentication mechanism; however, this mechanism is only for authenticating the data payload of the packet (and associated ESP headers/trailers). Therefore, ESP does not authenticate an IP Header of a packet indicating an original IP address on the network from which the packet originated. It is also possible to use AH and ESP in conjunction with one another, in order to achieve the advantages of both.

Whether using AH or ESP, IPsec operates in either transport or tunnel mode. Transport mode is often used in host-to-host communications; i.e., when the peer devices are the endpoints of communication. Transport mode is most useful within an overall IPsec environment including the two endpoints. Tunnel mode is typically used in communications between an IPsec-protected system and some other endpoint, such as communications sent from a private network over the Internet. In tunnel mode, the payload of a secured IP packet carries another packet containing the actual data payload to be transmitted.

A common use of the tunnel mode is to implement a Virtual Private Network (VPN). VPNs are networks that use publicly-available network resources, such as the Internet, to construct a network accessible only by selected parties. For example, a company may create its own version of a Local Area Network (LAN) using the Internet, or a worker working from a remote location may be able to utilize company resources at a company headquarters.

In order to implement the various protocols and modes of IPsec such as those discussed above, a security association (SA) is typically formed. An IPsec SA is essentially a contract or agreement between parties defining conditions according to which the two parties will communicate. For example, an IPsec SA is typically a one-way connection that defines, for example, encryption algorithms to be used during information exchange. SAs are defined by such parameters as an IP destination address and a security protocol identifier (e.g., AH or ESP). SAs typically include a security parameter index (SPI), which is a 32 bit identification number.

If an IPsec SA is considered a contract or agreement, then the terms thereof can be considered to be negotiated by a separate protocol (or manually). In other words, both communicating parties must agree on actions that will be taken on communicated packets in order to encrypt/decrypt those packets. One such protocol is known as the Internet Security Association and Key Management Protocol (ISAKMP), and one implementation of ISAKMP is known as the Internet Key Exchange (IKE).

IKE typically operates in two phases. In a first phase, parties agree as to how to protect further negotiation traffic. For example, IKE may authenticate a sender by virtue of, for example, public key encryption, also known as Diffie-Hellman encryption. In public key encryption, each user generates a public and private key, where the public key is then sent to the other party. When each user combines his own private key with the other's public key (and perhaps additional information), they each obtain an identical secret key. This secret key serves as a basis for deriving subsequent cryptographic keys.

In this way, a first user can encrypt a message using the second user's public key, and then only the second user (using his own private key) will be able to decrypt and receive the message.

Also, a first user can use his private key to sign a message and the second user, with the first user's public key, can receive and authenticate the transmitted message. Thus, the first user is authenticated to the second user as the one who sent the transmission; i.e., a "digital signature."

This latter methodology, however, does nothing to guard against the eventuality that a third party is merely pretending to be the sender (i.e., the first user) when the keys were generated in the first place. Therefore, independent and trusted Certification Authorities (CAs) exist which issue digital certificates verifying the association of a public key with a particular user, along with other identifying information.

There are two primary modes for phase 1 of IKE: main mode and aggressive mode. Main mode, generally speaking, is a more involved but more secure method. Aggressive mode, though faster, sacrifices identity protection; however, using the public key encryption methodology just discussed obviates the need for this feature.

In a second phase, IKE negotiates the actual IPsec SA (over which the actual application layer data exchanges will take place) by setting up the encryption/authentication keys for the AH and/or ESP protocols. In particular, "quick mode" negotiates the SAs for general purpose IPsec communications. Also, it should be noted that, typically, only one phase 1 negotiation is needed for an associated plurality of phase 2 operations by a plurality of peer devices. This allows the multiple peer devices to each take advantage of the phase 1 proceedings, thereby establishing secure connections more quickly and more easily.

As shown in the above discussion, therefore, various solutions exist for implementing private and authenticated network communications. However, all of the above-discussed methodologies are conventionally implemented on a peer-to-peer and point-to-point basis. Such methodologies, unfortunately, cannot easily be extended to multicast (i.e., multi-peer to multi-peer) networking.

In other words, if each member of a group of peer devices wishes to have the capability to direct communications to each of the remaining members of the group (including simultaneously), they would have to establish SAs and IPsec tunnels between every pair of devices in the group. This number of SAs and IPsec tunnels needed to implement such a full mesh design can be described by Equation (1):

$$C(n, k) = \frac{n!}{[k!(n-k)!]} \quad (1)$$

Equation (1) is a well-known combinational law, where "n" represents the number of devices participating in the group of devices, "k"=2 since only peer-to-peer connections are contemplated, and C(n,k) represents the number of connections needed. Thus, for seven devices, twenty-one peer-to-peer connections would be needed. Moreover, this number expands to forty-two SAs, since IPsec SAs are typically unidirectional and must be individually established in both directions between a given pair of peers.

Creating and managing this number of connections, which increases rapidly when even more devices are included, is impractical. In particular, creating such a large number of SAs is very costly in terms of both time and computing resources, and managing/implementing IPsec tunnels corresponding to the SAs is also difficult.

Certain conventional protocols attempt to implement a full mesh connection at a network level. For example, the Multi-Protocol Label Switching (MPLS) service provides network administrators great flexibility in managing data flow through the network by allowing the diversion of data around congestion and bottlenecks. However, such conventional mesh network structures do not, by themselves, adequately address security concerns; moreover, they are not compatible with peer-to-peer approaches such as that employed by IPsec and other security protocols.

Therefore, what is needed is a methodology for implementing a secure private network that is easy and inexpensive to create and manage, that allows multi-casting between members, and that is easily scaleable for the purposes of increasing the number of the members.

SUMMARY OF THE INVENTION

In a first exemplary embodiment, the present invention relates to a method for implementing secure communications between a plurality of devices. Such a method may comprise providing at least one common encryption parameter to each of the plurality of devices, identifying the plurality of devices to one another and thereafter establishing a secure, point-to-point connection between at least two of the plurality of devices.

In a second exemplary embodiment, the present invention relates to a server device for implementing a secure network connection between a plurality of devices. The server device according to this embodiment may comprise a means for securely distributing connection information to each of the plurality of devices, as well as a means for enabling secure, point-to-point communication between any pair of the plurality of devices based on the connection information.

In a third exemplary embodiment, the present invention relates to an article of manufacture, which comprises a computer readable medium having stored therein a computer program carrying out a method for implementing a virtual private network. Such a computer program may comprise a first code segment for authenticating member devices of the virtual private network, a second code segment for providing a secret encryption parameter to each of the authenticated member devices seeking to conduct active communications within the virtual private network and a third code segment for distributing a list of each of the authenticated member devices to the other member devices.

In a fourth exemplary embodiment, the present invention relates to a method of utilizing a virtual private network. Such a method may comprise contacting a server device administering the virtual private network, and thereafter receiving information authenticating the server device and each of a plurality of members of the virtual private network. The method may further comprise receiving an encryption parameter from the server device that is commonly obtainable by all members of the virtual private network, and thereafter receiving a list of all members of the virtual private network.

In a fifth and final exemplary embodiment, the present invention relates to a method of activating a first and second device within a virtual private network (VPN) managed by a server. Such a method may comprise negotiating a first security association between the server and the first device, determining an encryption secret key with the first device as part of the first security association, negotiating a second security association between the server and the second device, communicating the encryption secret key to the second device as part of the second security association, and establishing an IPsec session between the first and second devices based on the encryption secret key.

The features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 6A and 6B demonstrate information tables used in implementing multicast VPN sessions according to one embodiment of the invention.

DETAILED DESCRIPTION

Figure 1A:
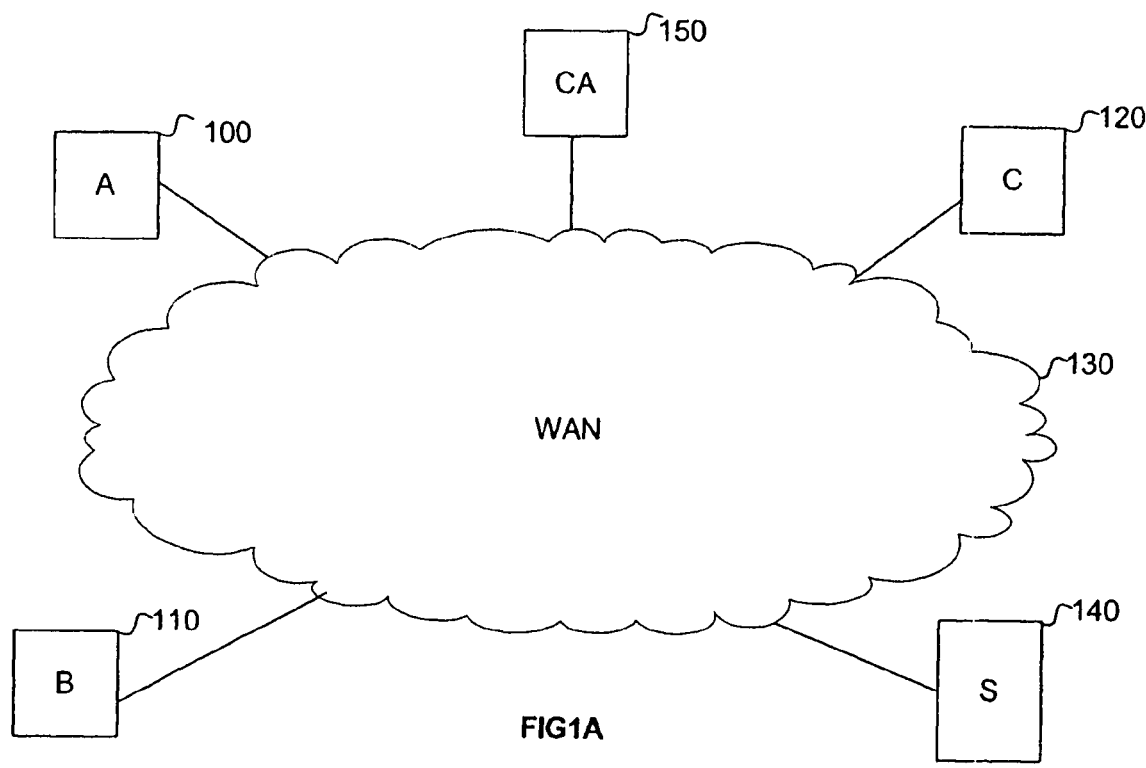
FIG. 1A demonstrates an exemplary network environment in which the present invention might operate.

While the present invention is described below with respect to various exemplary embodiments, the present invention is not limited to only those embodiments that are disclosed. Other embodiments can be implemented by those skilled in the art without departing from the spirit and scope of the present invention.

In this regard, although IPsec is used herein to demonstrate an exemplary embodiment of the invention, it should be understood that the present invention can be utilized in the context of other conventional network security protocols, such as Layer 2 tunneling Protocol (L2TP) and Point-to-point Tunneling Protocol (PPTP), as would be apparent. Similarly, other protocols/methodologies besides IKE and public key encryption exist which are useful in implementing network security protocols, and the present invention can be implemented in those environments as well.

Moreover, it should be noted that the terminology and associated definitions used herein are subject to some level of disagreement in the art, as is known. For example, some artisans will describe IKE as an instance of ISAKMP, whereas others will describe IKE as the combination of ISAKMP with certain other protocols. Such terminology and definitions are used singularly and consistently herein only for the purposes of clarity; therefore, it should be understood that such usage is designed merely to explain and not limit the present invention. Similarly, terms such as "encryption," "encryption parameters" or any other term of art, unless otherwise specified or limited herein, are not intended to be re-defined to have a special meaning herein and should be given their broadest reasonable interpretations consistent with the conventional understanding in the art.

The present invention, in an exemplary embodiment, operates by implementing a multi-point server device (MPS) that is responsible for negotiating a Security Association (SA) with each member device of a Virtual Private Network (VPN). The server device operates to share at least one encryption parameter that is common to all of the VPN members. In this way, each VPN member may establish an IPsec session (tunnel) with each one of the other members.

Thus, conventional VPNs are improved upon in at least the following manners. First, the number of SAs to be negotiated and managed for each VPN is reduced from a potentially very large number down to one SA per MPS-member device pair. Second, although the same number of IPsec tunnels must still be created and managed as in conventional VPNs, doing so is greatly simplified by using at least one common encryption parameter (such as a common encryption secret key).

The multi-point server device can be any secure device; some examples of devices which may serve as the multi-point server include routers, firewalls or gateways, such as might be implemented by an Internet Service Provider (ISP). The MPS may be included within an existing network node or implemented in a separate device. The MPS may, but need not be, located in a path of the data being communicated by the VPN members.

In one embodiment, the multi-point server (MPS) negotiates an SA individually with each VPN member device. The SA serves to provide each member device with a shared encryption parameter, such as a shared secret key for encryption, and a list of devices either currently acting as VPN members and/or devices authorized to join the VPN. With respect to this list of (potential) member devices, the MPS may authenticate the devices by including, for example, their authentication public keys with the list.

In this way, all information necessary to set up and/or join the VPN can be communicated to the current and potential devices via the SA. As an alternative, at least some of the above-described information can also be communicated to the devices by way of digital certificates. Moreover, devices wishing to join the VPN may locate the MPS using digital certificates. The use of digital certificates in these contexts is discussed in more detail below.

Thus, the present invention provides many advantages in the creation and management of a VPN. It should be noted that the present invention is particularly advantageous when used in conjunction with services that provide a multicast, mesh environment, such as Multi-Protocol Label Switching (MPLS) discussed above, to enable secure, point-to-point communications such as IPsec traffic in such an environment.

Improvements provided by the present invention exist in both the creation and use of the SAs and in the forwarding of packets between VPN member devices once the IPsec sessions have been established.

For example, using the present invention, it is possible to easily add a new device to an already-created and operational VPN. These and many other advantageous features are discussed in more detail below with respect to the exemplary embodiment of the invention shown in FIGS. 1-7.

FIG. 1A demonstrates an exemplary network environment in which the present invention might operate. In FIG. 1A, device 100 may be a router, gateway or host device connected to WAN network 130. WAN network 130 may be a public network such as the Internet, or it may be a private network. Other end devices 110 and 120 represent devices that are potential members of a VPN. Device 150 represents a certification authority (CA) that may also be accessed by WAN network 130. Device 140 represents a Multi-point server (MPS) according to one embodiment of the present invention, which will be responsible for managing an SA with each end point device.

Although only three member devices 100, 110 and 120 are shown in FIG. 1A, of course a much larger VPN could be supported by the present invention. Similarly, although only one MPS 140 is shown, it is possible to have a number of MPS devices, each supporting its own VPN. It is also possible to have a backup MPS in case of a failure of a primary MPS.

Figure 1B:
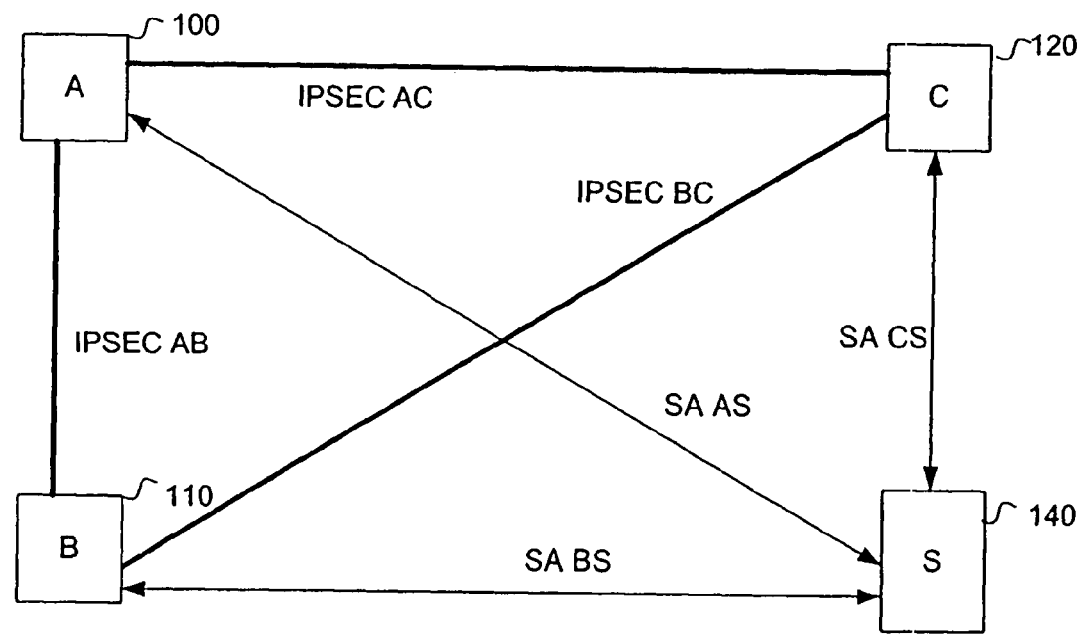
FIG. 1B demonstrates various SA and IPsec connections that may be used in starting, activating and utilizing an embodiment of the present invention.

FIG. 1B demonstrates various SA and IPsec connections that may be used in starting, activating and utilizing an embodiment of the present invention.

As already discussed, conventional IPsec implementations would require that each of devices 100-120 form a separate SA with each of the other devices, whereupon IPsec sessions between each pair of the devices could be established based on the various SAs. However, according to an embodiment of the present invention, each device 100-120 need only form one SA between itself and MPS device 140. Specifically, device 100 forms SA AS, device 110 forms SA BS and device 120 forms SA CS, as shown.

Once the SAs have been negotiated, the devices 100-120 may establish a plurality of IPsec sessions based thereon. In the example of FIG. 1B, the devices form three two-way sessions (shown as IPsec AC between devices 100 and 120, IPsec AB between devices 100 and 110 and IPsec BC between devices 110 and 120), over which IPsec packets can be transmitted. Once these IPsec sessions are established, secure, point-to-point communications may occur between each of the devices, including multi-cast communications wherein one of the devices simultaneously addresses both of the other devices.

Figure 2:
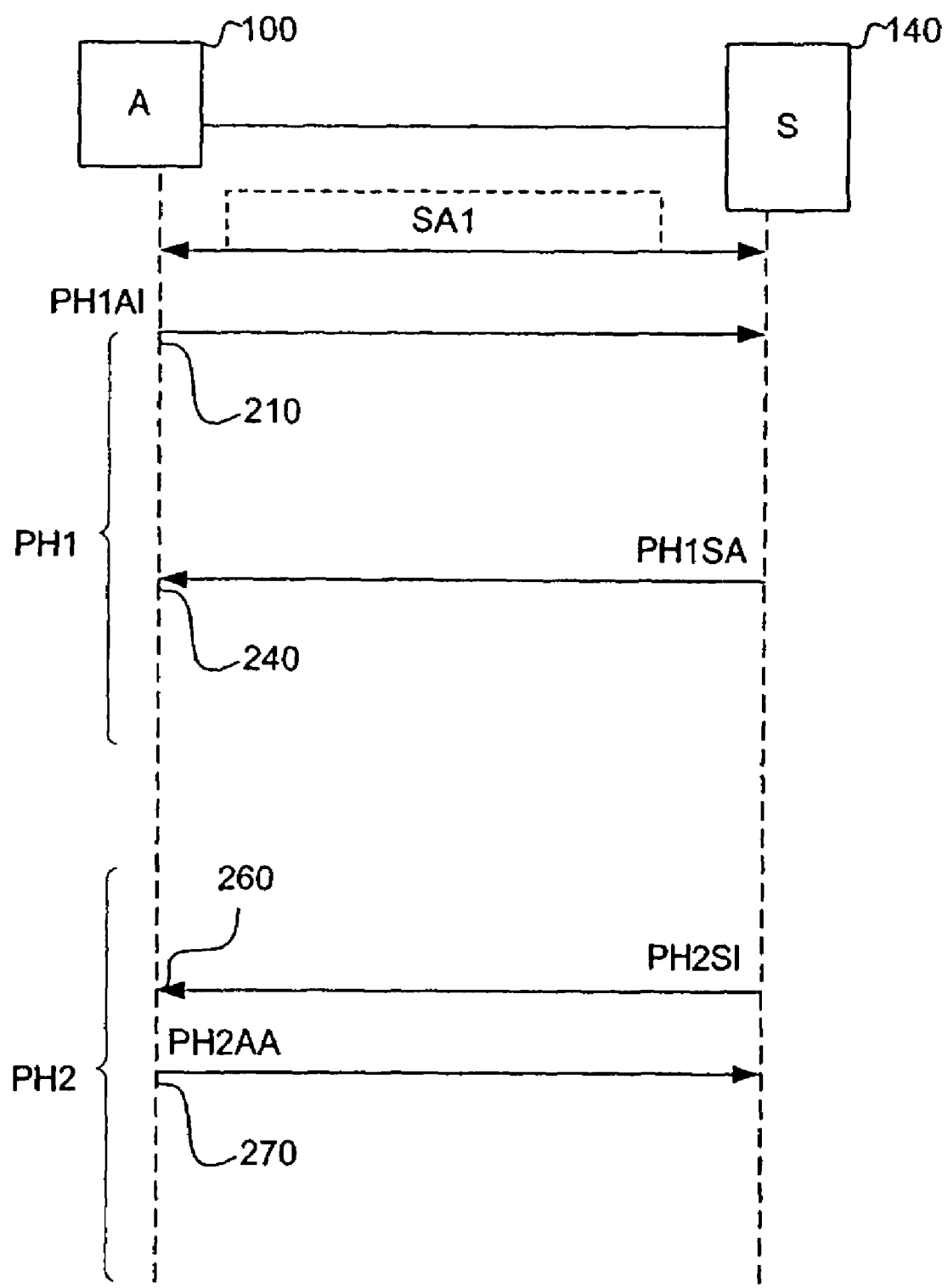
FIG. 2 demonstrates an exemplary methodology for negotiating an SA between the MPS and a member device according to one embodiment of the invention.

FIG. 2 demonstrates an exemplary methodology for negotiating an SA between the MPS and a member device according to one embodiment of the invention.

In FIG. 2, device 100 seeks to join an IPsec, multicast VPN session. Therefore, device 100 initiates a security association to be formed, labeled SA1, by sending transmission 210 to MPS 140. It should be understood that similar processes are applicable with respect to devices 110 and 120, as well as other devices (not shown).

In order to participate, in such a session, device 100 should belong to the appropriate VPN. The fact that device 100 belongs to the VPN can be verified in a variety of ways. For example, device 100 can be pre-configured such that an address "S" of MPS 140 has been predefined within device 100 and a device authentication key has been set within device 100 that includes a public key for that device that is also pre-stored within MPS 140. MPS 140 can then accordingly verify a membership of device 100 in the VPN by checking an internal table, as discussed in more detail with respect to FIG. 6.

A second exemplary methodology is to define a certificate for device 100 (discussed in more detail in FIG. 6) to be stored in CA 130. This certificate can then contain verification of device 100 as a member of the VPN in question, as well as an authentication public key of device 100. Both device certificates and VPN certificates are discussed in more detail with respect to FIG. 5.

Transmission 210 begins a phase 1 session (PH1AI) between device 100 and MPS 140. Thus, as referred to above, transmission 210 serves to protect further negotiation traffic using the main mode. As is known, the main mode provides protection for the identity of the involved devices. It is typically divided into three sets of messages, each set containing two messages. The first two messages are used for negotiating a security policy for the exchange, the next two messages are used for the Diffie-Hellman keying material exchange and the last two messages are used for authenticating the peers, such as with digital signatures and optional digital certificates.

MPS 140 replies to transmission 210 with a standard message such as PH1SA transmission 240. Within this message, MPS 140 provides its own authentication parameters, including its own authentication public key. As is known, the keys used in phase 1 are typically used for authentication purposes within the SA negotiation; however, they may also be used for encrypting some SA messages, e.g., within phase 2 of the SA negotiations.

Once phase 1 is achieved, a fully secure authenticated channel with possible encryption is established in order to proceed with SA phase 2. Phase 2 allows the definition of parameters for the IPSec protocol itself, and generally makes use of the Quick mode discussed above. A Diffie-Hellman key exchange may be done to achieve forwarding secrecy.

In FIG. 2, MPS 140 acts as the initiator of phase 2. It is not required that MPS 140 initiate phase 2; however, it is preferable inasmuch as most of the information provided in this stage will be transferred from MPS 140 to device 100. During phase 2, MPS 140 will provide device 100, using messages such as transmission 260, with a list of other devices that are members of the same VPN, including their current status (e.g., active or inactive), as well as their authentication public keys. Such a list can be contained within a table within MPS 140, as is also shown and discussed with respect to FIG. 6. Also, a status of device 100 within the list can be changed at this point from Not Connected (NC) to Pending (PEND), which notifies other devices of the status of device 100 and allows device 100 to complete the SA negotiation process once it has started, without having to restart upon, for example, a change in status of another device during the process.

During phase 2, MPS 140 can provide to device 100 an IPsec encryption secret key that is, or will be, common to all of the devices belonging to the VPN for the duration of the SA. The secret key ("Ke") can be encrypted by MPS 140 for secure delivery to device 100 by using a public key of device 100 ("PkA"), such as the device 100 public key previously used in phase 1. The combination of the public key of device 100, PkA, and the common secret key, Ke (i.e., PkA(Ke)), can thus be forwarded within phase 2 of the SA to device 100. In this way, device 100 will be able to obtain the secret key Ke by decrypting it from the combined keys using its own private secret key.

Other legacy parameters given by MPS 140 to device 100 may include, for example, an SA duration, header types for IPsec that will be used (such as the ones described in FIGS. 4A to 4D), and various other parameters, as would be apparent.

As a final step in activating the SA, device 100 sends transmission 270 to MPS 140 once it has received all necessary parameters therefrom. At this point, MPS 140 may change a status of device 100 to ACTIVE (see FIG. 6). Once the SA is active, IPsec traffic may commence in both directions between device 100 and any or all of the already active VPN members.

In this regard, it should be noted that it is not necessary to follow the procedures shown in FIG. 2 in a reverse direction; i.e., to establish a secondary SA between MPS 140 and device 100 that is initiated by MPS 140. Although this procedure would conventionally be necessary as discussed above, the fact that one secret key is shared among all of the devices 100-120 for data encryption and the same authentication key is used for all connections obviates the need and therefore further improves the cost, convenience and scalability of implementing the present invention.

Figure 3:
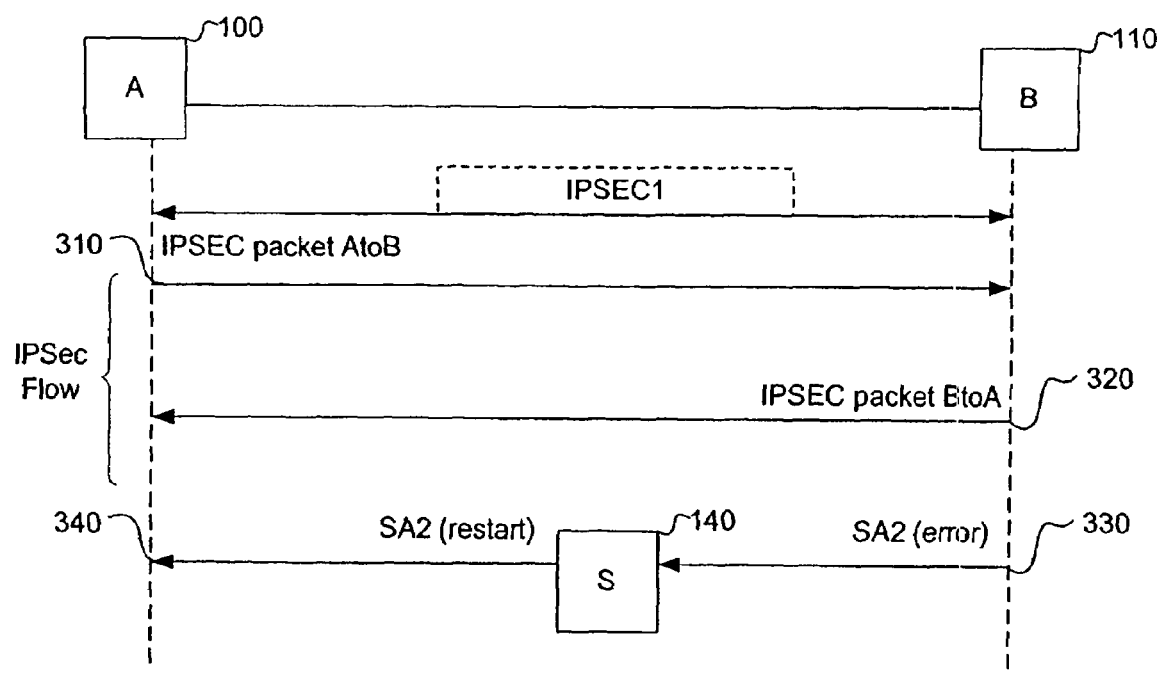
FIG. 3 demonstrates an exemplary methodology for conducting IPsec traffic between two member devices according to one embodiment of the invention.

FIG. 3 demonstrates an exemplary methodology for conducting IPsec traffic between two member devices according to one embodiment of the invention. Such traffic can be sent transparently from device 100 to device 110 (e.g., transmission 310), or from device 110 to device 100 (e.g., transmission 320).

When the AH protocol is used by itself, it is not necessary to have a secret key during the SA negotiation, since no encryption will be set. However, when ESP is used, an encryption secret key will be distributed as described above. In the latter case, additional authentication may also be performed using IPsec authentication keys.

Even if packets sent as part of an IPsec session are authenticated and encrypted, if a third party can both intercept the packets and gain knowledge of the sender's keystrokes (e.g., by monitoring the sender's keyboard with software), then that third party can compare the keystrokes to the data traffic and eventually deduce at least some contents of a particular packet. For example, the third party might deduce that a particular packet contains a command such as "delete all files," and then re-send that packet at a later time. This is conventionally known as a "replay attack."

To guard against a replay attack, when forming an SA, devices often agree upon a "sequence number" known only to the sender/recipient pair, which increments with each new packet. In this way, a recipient device can tell at least this difference between incoming packets, and may reject a packet with an already-used sequence number.

If there is an automatic reset within the sequence number (for example, after a certain amount of time expires), then a device such as device 110 can contact MPS 140 so that a secondary secret key can be distributed by MPS 140. This distribution can usually be accomplished in a phase 2 SA message; i.e., using the previously-negotiated phase 1 parameters.

If there is a mismatch in the sequence number (or new key usage) between devices, an entirely-new SA may be restarted by the involved devices; i.e., the sender/recipient pair in the IPsec session. Often, only one device will have detected the error, and so that device will initiate the new SA with MPS 140 in message 330 (as shown in FIG. 3) and indicate the other device that was party to the transmission. At that point, MPS 140 may restart the IPsec session using a current secret key, without impacting remaining VPN traffic (including traffic between either of the affected devices and other VPN members). This may be done via a phase 2 "restart" message 340, as is also shown in FIG. 3.

It should also be noted that regular changes at an expiration of the SA can be started by MPS 140, which can anticipate the expiration and provide status reports and a new encryption secret key to each device in a pre-arranged way. When this is achieved, the sequence number is reset according to the AH or ESP protocol by each IPsec sending device, to thereby identify packets on which the new encryption key should be used.

According to one embodiment of the invention, only devices classified as active may participate in an IPsec packet transmission. If an active device 100 wishes to contact an inactive or not connected device 120, then device 100 can send a request through MPS 140, which can gather all such requests and reply with an "update" message detailing any status changes that have occurred in the VPN since the last update message. Since IPsec sessions according to the embodiment of the invention will typically be close to permanent, the status of the various devices will be fairly stable; therefore, the number of update messages to be sent will often be limited. Nevertheless, the use of such update messages can be very useful in that they allow dynamic addition of devices to a running IPsec multicast session.

FIGS. 4A-4D describe structures of exemplary IPsec packets that may be transported according to various embodiments of the invention.

Figure 4A:
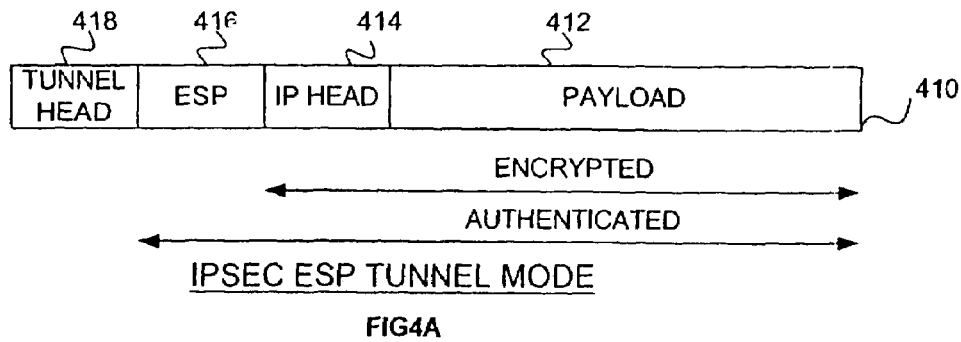
FIGS. 4A-4D describe structures of exemplary IPsec packets that may be transported according to various embodiments of the invention.

In FIG. 4A, packet 410 represents an IPsec packet using IPsec tunnel mode with an ESP header 416. The inner payload 412 and IP header 414 are encrypted, while the entire packet except the tunnel header 418 is authenticated (i.e. integrated in the packet signature).

Figure 4B:
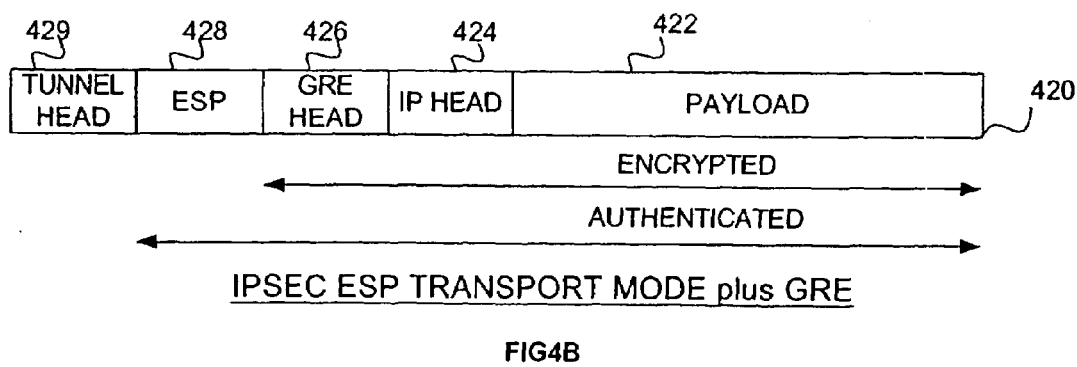

In FIG. 4B, packet 420 represents an IPsec packet using IPsec transport mode with ESP header 428 and Generic Routing Encapsulation (GRE) tunneling. The inner payload 422 and IP header 424 as well as the GRE portion 426 are encrypted, while the entire packet except the tunnel header 429 is integrated in the packet signature (i.e., authenticated).

Figure 4C:
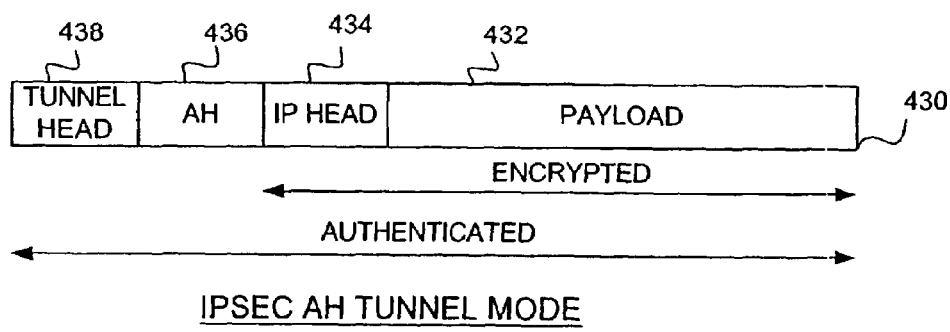

In FIG. 4C, packet 430 represents an IPsec packet using IPsec tunnel mode with AH header 436. No field is encrypted, while the entire packet including the tunnel header 438 is integrated in the packet signature. This mode may be used for authenticating flows within a VPN and ensuring integrity when encryption is not required or not appropriate. It may be utilized when encryption is done at the application level.

Figure 4D:
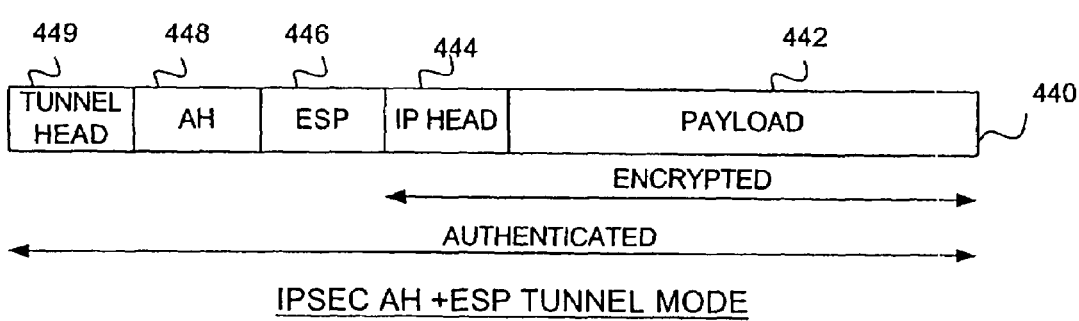

In FIG. 4D, packet 440 represents an IPsec packet using IPsec tunnel mode with AH and ESP headers 448 and 446, respectively. The inner payload 442 and IP header 444 are encrypted, while the entire packet including the tunnel header 449 is integrated in the packet signature.

FIGS. 5A-5F demonstrate exemplary certificate structures for each device type when certificates are used within a VPN implementing one embodiment of the present invention.

In particular, FIGS. 5A-5E, representing certificates 500a-500e for devices 100, 110, 120 and 140 having device addresses A, B, C and S, respectively, are largely standard certificates that would typically be issued for those devices. Fields 510a-510e contain information relating to the CA 150, including the CA identity and certificate signature, as is conventional. Fields 520a-520e contain various conventional pieces of information pertaining to the devices themselves, including their respective WAN identities, IP addresses and public keys.

Fields 520a-520e also contain additional, non-standard, information. For example, in a GROUP ID field, a list of VPNs managed by a particular MPS may be maintained. Such a list may be useful, for example, if a relatively large number of VPNs are defined such that the MPS in question may have difficulty managing all of the VPNs when a large percentage of the devices are active. Thus, device 100 may be able to determine whether some pre-determined number of devices/VPNs are being actively managed by a particular MPS by examining the GROUP ID. This mechanism allows load-sharing of VPN management, as needed, among multiple MPS servers (if a plurality of such servers are available). Note that VPN IDs are fixed values corresponding to customers, whereas GROUP IDs are flexible values used by network providers that may be changed for optimization of resources without customer impact. Particular GROUP ID(s) and VPN ID(s) may be grouped together for use in a small network. Also, GROUP ID may be used to identify a set of MPS servers optimized for some pre-determined, specialized encryption techniques.

Additionally, a VPN ID field may be included that identifies the VPN to which the particular device belongs within the above-defined GROUP of VPNs. It should be noted that the GROUP ID field may not be needed if only a limited number of VPNs are implemented by the server in question.

When a server is identified by a GROUP ID, it can be shared for the entire group, i.e., all the VPNs belonging to that group, in which case a dedicated certificate such as 500d may be utilized. Alternatively, the server can be used to manage just a portion of the VPNs in the group. In this case, a shared server certificate such as certificate 500e can be used to define which VPNs are included within the group. A MPS server may also be dedicated to a particular VPN or customer, in order to provide improved security.

Figure 5A:
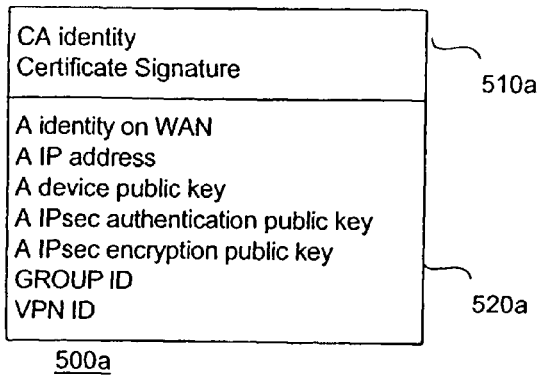
FIGS. 5A-5F demonstrate exemplary certificate structures for each device type when certificates are used within a VPN implementing one embodiment of the present invention.
Figure 5B:
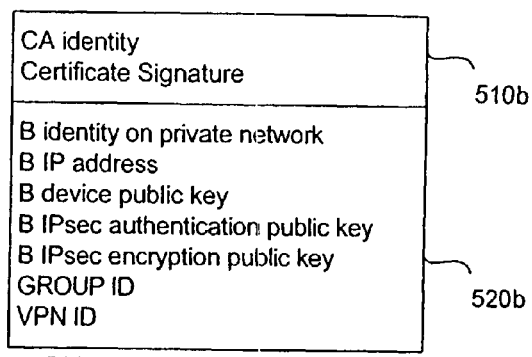
Figure 5C:
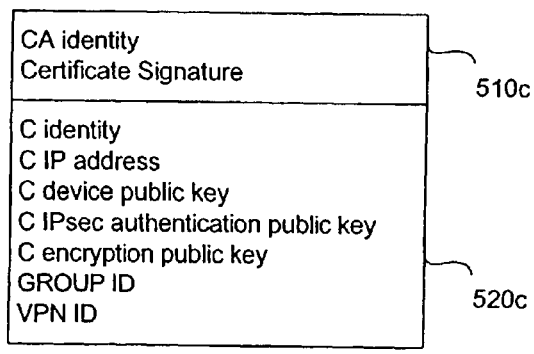
Figure 5D:
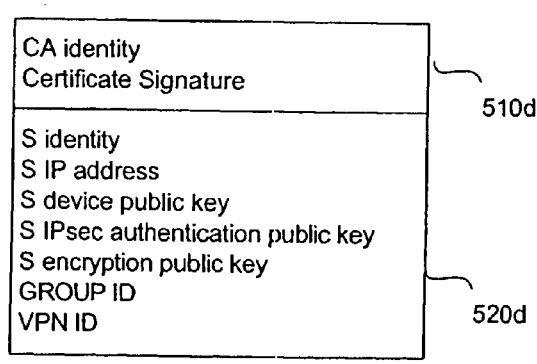
Figure 5E:
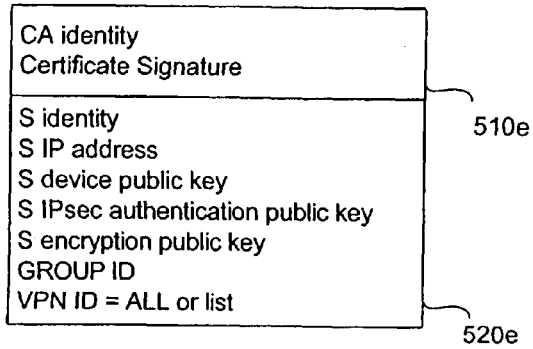
Figure 5F:
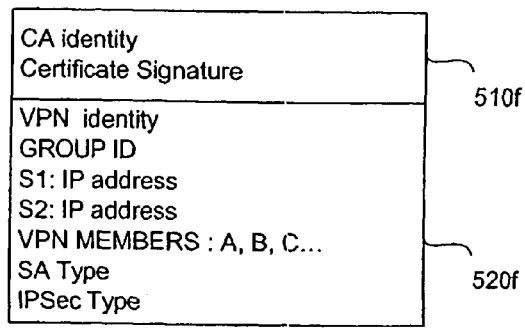

Additionally, a new type of certificate 500f is defined according to one embodiment of the invention and is shown in FIG. 5F. Certificate 500f is designed to link VPN member devices together in multicast groups. They are helpful in recovering device/server certificates needed to establish the multicast session.

Certificate 500f is identified by both the GROUP ID and VPN ID, and identifies all the servers such as S1 and S2 (primary and backup) for the VPN and all potential members. A particular SA methodology and IPsec parameters can also be defined within the certificate as common to all the members. The information contained within certificate 500f allows MPS 140 to build a table (see FIG. 6) correlating VPN members with the appropriate server(s), so that each member device needs only this certificate to begin an SA with the server. Once the SA is initiated/negotiated, the server in question will be able to obtain the device certificates such as 500a-c.

In addition, a GROUPID certificate (not shown) may be built providing at least the MPS servers' identity and a list of associated VPNs. Such a certificate may be more useful for management purposes than for operational purposes.

Alternatively, rather than require the server obtain information as described above, each of the individual devices may ask for the certificates of its neighbor devices. However, for a large number of devices, this methodology may become difficult or impractical to implement.

It should be noted that the certificates used by the present invention may also include various other fields, such as a certificate expiration date; however, such fields are conventionally-known and are not included for the purposed of clarity.

FIGS. 6A and 6B demonstrate information tables used in implementing multicast VPN sessions according to one embodiment of the invention.

In FIG. 6A, a global table 610 labeled "VPN1 S Table" is shown. It will typically be located in a multi-point server such as MPS 140, and will contain the public keys, device name and IP address for each of the devices belonging to a defined VPN/GROUP; here the devices 100-120 having names A, B and C respectively are shown in lines 620-640.

The device name may be, for example, a network name described by a Domain Name Server (DNS), if available, or some other name such as a login name. In FIG. 6A, PUB KEY 1 represents the public key for phase 1 of an SA that may be used for device authentication and SA message encryption; PUB KEY 2 represents the authentication public key used within IPsec sessions; and PUB KEY 3 represents an optional encryption key to use for transmitting the secret key from MPS 140 to a given VPN member device. For PUB KEY 3, the device public key (PUB KEY 1) may also be used; however, it may be preferable to utilize a longer/stronger key than that one for encrypting the secret key.

FIG. 6B demonstrates a second table 660 labeled "VPN1 Distributed Table." In table 660, each device 100-120 has a row 670-690, respectively, that contains information as to which other device(s) may be members of the same VPN. Table 660 provides, for example, a device name (e.g., A, B or C) and IP address of the VPN devices (note that the device address is not necessary, but may be helpful, especially in the case where dynamic IP addresses are used). Table 660 also contains the authentication keys of the peer devices, in order to allow authentication of packets coming from those peer devices, as discussed above with respect to FIG. 2. Table 660 also contains an indication of a status of each device; i.e., whether the device is Active (ACTIVE), Not Connected (NC) or currently in the process of (Pending) being connected (PEND).

The tables 610 and 660 are updated regularly, and are updated at a minimum before an expiration date of any certificate used to build the table(s). A revocation process with a conventional certificate revocation server may be used to dynamically clear the tables.

Figure 7A:
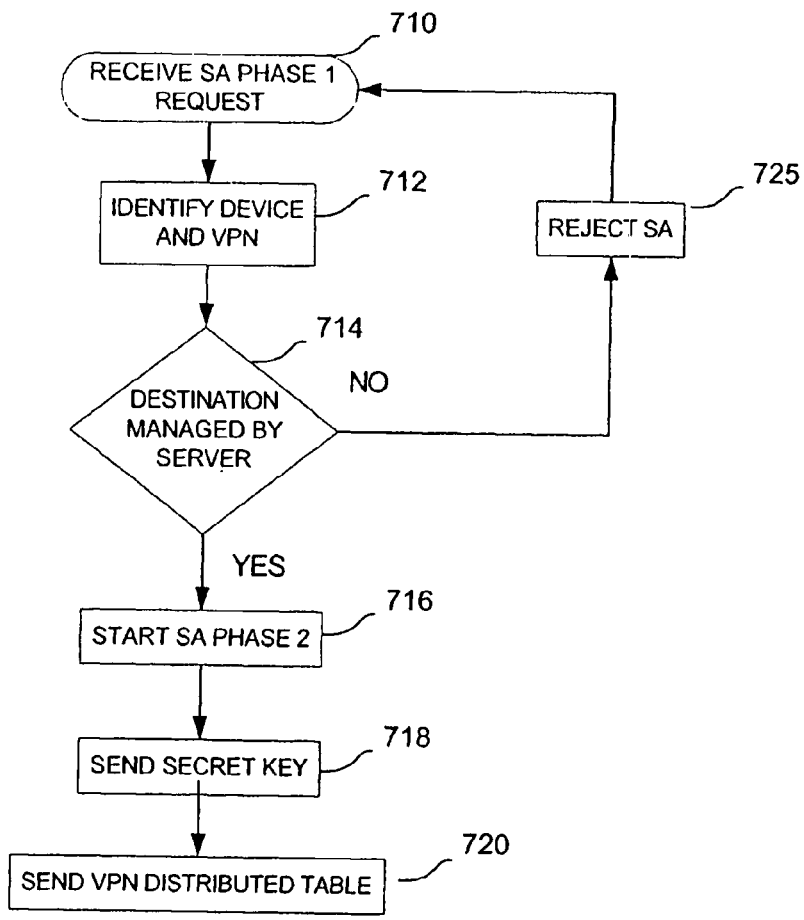
FIGS. 7A and 7B demonstrate exemplary SA process and message handling steps within a multi-point server according to one embodiment of the invention.
Figure 7B:
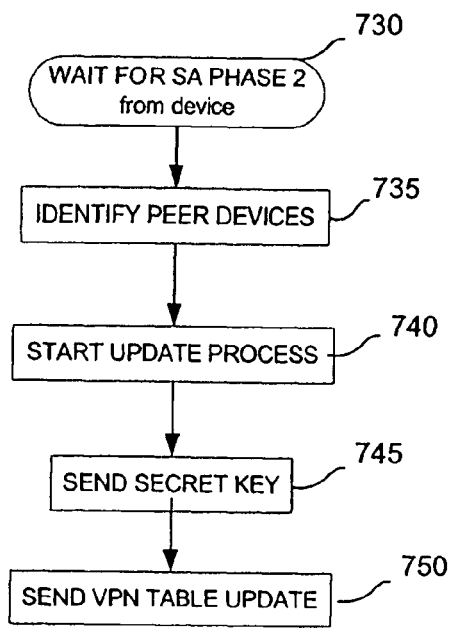

FIGS. 7A and 7B demonstrate exemplary SA process and message handling steps within a multi-point server according to one embodiment of the invention.

In FIG. 7A, a phase 1 SA message is received by MPS 140 in step 710 from a device such as one of devices 100-120. In step 712, MPS 140 checks the device identity and VPN using the device public key provided. Verification using a certificate of the device may be done if the table 610 doesn't contain valid information for the corresponding device.

If the device is valid and belongs to a VPN managed by MPS 140, as judged in step 714, then phase 2 of the SA negotiation may begin in step 716; otherwise, the SA will be rejected in step 725, whereupon the device will be notified of the failure and a log may be created for network management purposes.

If the SA negotiation does continue, then the common secret key is sent to the device in step 718 and the VPN distributed table 660 is sent in step 720.

In FIG. 7B, in step 730, a phase 2 SA message is received at MPS 140 from a device that is normally active; typically, this scenario will occur upon the detection of an error by the sending device. Using the information provided, MPS 140 should be able to, in step 735, identify the source of the message as well as the IPsec peer device with which the sending device has detected a problem.

Thereafter, an update process may be started in step 740 that corresponds to the process discussed above with respect to FIG. 3; i.e., the common secret key is re-sent to both identified devices in step 745 and the VPN distributed table 660 is re-sent in step 750, where table 660 contains only the devices (typically only one) found to be involved in the particular problem detected. Whenever a device receives such an update, and even if the values are the same as pre-update values, it should restart its IPsec sessions with the listed devices.

If this process does not resolve the problem, a second error message can be received from the same device(s) (i.e., step 730 is repeated), whereupon the current SA can be aborted; i.e., an abort message can be sent by MPS 140 to all of the VPN devices, and the process will restart on step 710 for all of the devices.

In conclusion, the present invention provides a methodology for secure, full-mesh, multi-cast VPNs that is easy and cost-effective to implement and manage. In doing so, rather than have each member device negotiate a security association with each and every other VPN member device, a multi-point server negotiates a security association with each of the VPN member devices; during the negotiation, a common parameter is then distributed to all of the VPN member devices seeking to become active on the network, along with a list of the other VPN member devices. In this way, any VPN member device designated as active by the server may conduct an IPsec session with all of the other VPN member devices.

While this invention has been described in various explanatory embodiments, other embodiments and variations can be effected by a person of ordinary skill in the art without departing from the scope of the invention.

What is claimed is:

1. A method comprising:

at a multi-point server not comprised in a plurality of devices, said plurality of devices comprising a first device, a second device and a third device:

responsive to a detected mismatch in a packet sequence number of a communication between said first device and said second device, via a phase two restart message, restarting a first secure point-to-point connection between said first device and said second device, said phase two restart message adapted to cause a definition of IPSec protocol parameters without a new Diffie-Heilman keying material exchange, said first secure point-to-point connection established between said first device and said second device via at least one common encryption parameter, said at least one common encryption parameter provided to each of said plurality of devices, said at least one common encryption parameter provided responsive to a request from said third device for a second secure point-to-point connection between said third device and said second device, said plurality of devices identified to one another.

2. The method of claim 1, further comprising:

receiving said request from said third device for said second secure point-to-point connection.

3. The method of claim 1, further comprising:

providing said at least one common encryption parameter to each of said plurality of devices.

4. The method of claim 1, further comprising:

identifying said plurality of devices to one another.

5. The method of claim 1, further comprising:

establishing said first secure, point-to-point connection between said first device and said second device via said at least one common encryption parameter.

6. The method of claim 1, further comprising:

establishing secure, point-to-point connections between each of said plurality of devices.

7. The method of claim 1, further comprising:

establishing secure, point-to-point connections between each of said plurality of devices, wherein said at least one common encryption parameter is provided to each of said plurality of devices via a negotiated security association with each of said plurality of devices.

8. The method of claim 1, wherein each of said plurality of devices is identified to one another via a provided IP address and a provided authentication key of each device to each other device comprised in said plurality of devices.

9. The method of claim 1, wherein said first secure, point-to-point connection between said first device and said second device is established via an IPsec session based on said at least one common encryption parameter.

10. The method of claim 1, further comprising:

based on an authentication public key of each device and a pre-stored list of device devices, authenticating each device as a device of a pre-defined virtual private network responsive to a negotiation of a security association between said multi-point server and each device, each device adapted to join said virtual private network as a result of a single security association formed with said multi-point server without forming any other security association with another device in the virtual private network.

11. The method of claim 1, further comprising:

obtaining certificate information from a certification authority relating to each of said plurality of devices and a pre-defined virtual private network made up of said plurality of devices;

authenticating each device as a device of said virtual private network based on said certificate information; and conducting an IPsec session based on said certificate information.

12. The method of claim 1, further comprising:

obtaining certificate information from a certification authority relating to each of said plurality of devices and a pre-defined virtual private network made up of said plurality of devices;

authenticating each device as a device of said virtual private network based on said certificate information;

conducting an IPsec session based on said certificate information; and restarting said IPsec session upon detection of a transmission error by one of said plurality of devices participating in said IPsec session.

13. The method of claim 1, further comprising:

providing a periodic update to said plurality of devices identifying a current status relative to each point-to-point connection as active, inactive, or connecting.

14. The method of claim 1, wherein said multi-point server is adapted to negotiate a security association with each member of a Virtual Private Network, said at least one common encryption parameter shared with each of a plurality of members of said Virtual Private Network, said multi-point server not a member of said Virtual Private Network, said plurality of members of said Virtual Private Network comprising said first device, said second device and said third device.

15. The method of claim 1, wherein said multi-point server is adapted to negotiate a security association with each member of a Virtual Private Network, said at least one common encryption parameter shared with each of a plurality of members of said Virtual Private Network, said multi-point server not a member of said Virtual Private Network, said multi-point server adapted to authenticate each of said plurality of members of said Virtual Private Network via a public key of each of said plurality of members of said Virtual Private Network and a list of potential members of said Virtual Private Network, said plurality of members of said Virtual Private Network comprising said first device, said second device and said third device.

16. The method of claim 1, wherein said first device, said second device and said third device communicate via Multi-Protocol Label Switching.

17. The method of claim 1, wherein said multi-point server is adapted to negotiate a security association with each member of a Virtual Private Network, said at least one common encryption parameter shared with each of a plurality of members of said Virtual Private Network, said multi-point server not a member of said Virtual Private Network, each of said plurality of members adapted to join said Virtual Private Network via a formation of only a single security association with said multi-point server, said plurality of members of said Virtual Private Network comprising said first device, said second device and said third device.

18. The method of claim 1, further comprising:

from said multi-point server, communicating a status of each member of a Virtual Private Network comprising said first device, said second device, and said third device to each of said first device, said second device, and said third device, said status selected from a Not Connected status, a Pending status, an inactive status, and an active status.

19. The method of claim 1, wherein said phase two restart message restarts a Virtual Private Network IPsec session using a current secret key without impacting remaining VPN traffic.

20. The method of claim 1, wherein said multi-point server anticipates an expiration of a security association with at least one of said first device, said second device, and said third device, said multi-point server adapted to provide a new encryption secret key to each of said first device, said second device, and said third device in a pre-arranged way.

21. The method of claim 1, wherein said multi-point server is adapted to provide a certificate to each of said first device, said second device, and said third device, said certificate comprising a field that lists Virtual Private Networks managed by said multi-point server.

22. The method of claim 1, further comprising adding a new device to said plurality of devices.

23. A method comprising:
responsive to a first security association between a server and a first device of a plurality of devices, establishing an IPsec session between said first device and a second device based on an encryption secret key, said IPsec session based upon a determined encryption secret key associated with said first device as part of said first security association, said IPsec session based upon a negotiated second security association between said server and said second device, said encryption secret key communicated to said second device as part of said second security association, said server adapted to, responsive to a detected mismatch in a packet sequence number between said fast device and said second device, via a phase two restart message, restart said IPSec session between said first device and said second device, said phase two restart message adapted to cause a definition of IPSec protocol parameters without a new Diffie-Hellman keying material exchange.

* * * * *